United States Patent
Starr et al.

(10) Patent No.: US 7,182,413 B2
(45) Date of Patent: Feb. 27, 2007

(54) VALVE SEAT FOR A CONTROL VALVE IN A VEHICLE BRAKE SYSTEM

(75) Inventors: Joseph A. Starr, Plymouth, MI (US); Eric R. Kaye, Livonia, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/634,529

(22) Filed: Aug. 5, 2003

(65) Prior Publication Data
US 2004/0251737 A1 Dec. 16, 2004

Related U.S. Application Data

(60) Provisional application No. 60/478,558, filed on Jun. 13, 2003.

(51) Int. Cl.
*B60T 8/36* (2006.01)
(52) U.S. Cl. .............................. 303/119.2; 251/129.02
(58) Field of Classification Search ............ 303/116.2, 303/119.1, 119.2, 119.3, DIG. 10; 251/129.02
See application file for complete search history.

(56) References Cited

U.S. PATENT DOCUMENTS 5,590,936 A * 1/1997 Reuter ..................... 303/116.1
5,762,103 A * 6/1998 Gregoire ................. 137/512.15
5,803,556 A * 9/1998 Weis et al. ............... 303/119.2
5,971,501 A * 10/1999 Hosoya .................... 303/119.2
6,019,441 A * 2/2000 Lloyd et al. ................ 303/156
6,298,873 B1 * 10/2001 LeVey et al. ............... 137/493

FOREIGN PATENT DOCUMENTS

DE          198 29 124      * 8/1999

* cited by examiner

*Primary Examiner*—Bradley King
(74) *Attorney, Agent, or Firm*—MacMillan, Sobanski & Todd, LLC

(57) ABSTRACT

A valve seat assembly for a control valve of a vehicle brake system includes a valve seat body. A valve passageway extends through a portion of the valve seat body. A groove is formed circumferentially in an outer surface of the valve seat body. The groove defines a groove surface substantially parallel to an axis of the valve body. A bore extends between the groove surface and the valve passageway to provide fluid communication between the groove surface and the valve passageway. A substantially resilient seal is disposed in the groove of the valve seat body.

21 Claims, 6 Drawing Sheets

VALVE SEAT FOR A CONTROL VALVE IN A VEHICLE BRAKE SYSTEM

CROSS REFERENCE TO RELATED APPLICATIONS

This application claims the benefit of U.S. Provisional Application No. 60/478,558 filed Jun. 13, 2003.

BACKGROUND OF THE INVENTION

This invention relates to vehicular brake systems, and more particularly to an improved valve seat for a control valve mounted in a hydraulic control unit of an electronically controlled brake system.

Electronically controlled brake systems for vehicles are well known. One type of electronically controlled brake system includes a hydraulic control unit (HCU) connected in fluid communication between a master cylinder and a plurality of wheel brakes. The HCU typically includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a sleeve or flux tube for movement relative to a valve seat. A spring is used to bias the armature in an open or closed position, thereby permitting or blocking fluid flow through the valve, respectively. A coil assembly is provided about the sleeve. When the valve is energized, an electromagnetic field or flux generated by the coil assembly causes the armature to slide from the biased open or closed position to a closed or open position, respectively.

Control valves mounted in a HCU are actuated by an electronic control module to provide desired braking functions such as anti-lock braking, traction control, and vehicle stability control. To provide desired braking responses, fluid flow must be maintained from the wheel brakes to the master cylinder during all fluid pressure conditions during brake release.

SUMMARY OF THE INVENTION

This invention relates to a valve seat assembly for a control valve of a vehicle brake system. The valve seat includes a valve seat body. A valve passageway extends through a portion of the valve seat body. A groove is formed circumferentially in an outer surface of the valve seat body. The groove defines a groove surface substantially parallel to an axis of the valve body. A bore extends between the groove surface and the valve passageway to provide fluid communication between the groove surface and the valve passageway. A substantially resilient seal is disposed in the groove of the valve seat body.

DETAILED DESCRIPTION OF THE INVENTION

Figure 1:
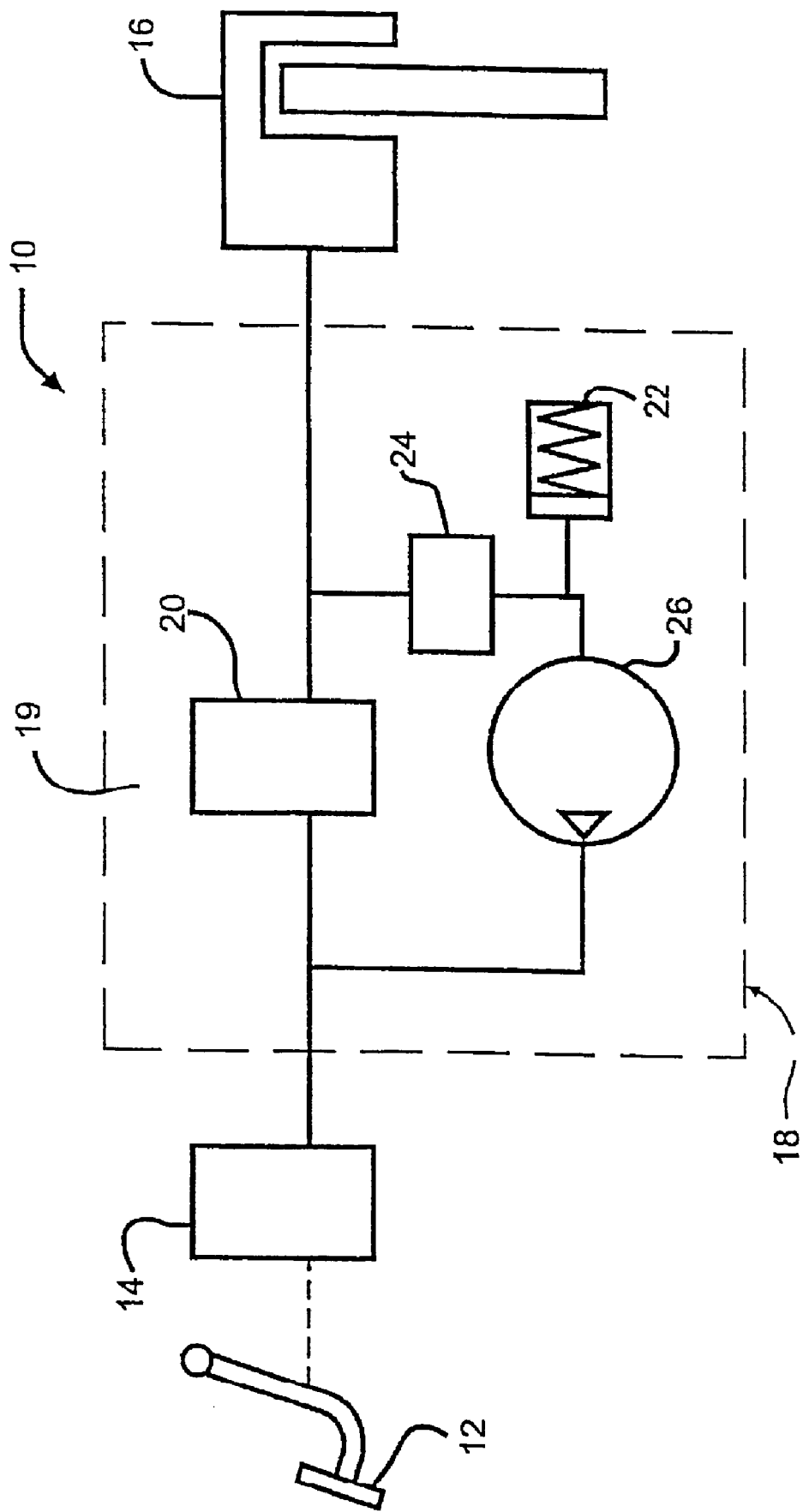
FIG. 1 is a schematic diagram of a vehicular braking system according to the present invention illustrating a hydraulic control unit having a normally open control valve, a normally closed control valve, an accumulator, and a pump.

An exemplary vehicular brake system having a valve according to this invention is indicated generally at 10 in FIG. 1. The brake system 10 includes valves and other components described below to provide an anti-lock braking function. In other embodiments, brake system 10 can also include components to provide traction control and/or vehicle stability control functions. In yet other embodiments, brake system 10 can be formed as an electronic brake management system.

The exemplary brake system 10 includes a brake pedal 12 connected to a master cylinder 14 for providing pressurized brake fluid to a plurality of wheel brakes 16, only one of which is shown. The wheel brake 16 is schematically illustrated as a disc brake. However, the wheel brake 16 may be any type of wheel brake found on vehicles, including a drum brake.

The brake system 10 also includes a hydraulic control unit (HCU) 18 connected in fluid communication between the master cylinder 14 and the wheel brake 16. The HCU 18 includes a housing 19 having bores for receiving control valves and other components described below. Fluid conduits are provided between the bores to provide fluid communication between the valves and other components. For purposes of clarity of illustration, only one set of components is illustrated in FIG. 1. Typically, however, the HCU 18 also houses corresponding components for other brake circuits and/or wheels of the vehicle.

The HCU 18 preferably includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel brake 16 and the low pressure accumulator 22, and a hydraulic pump 26 having an inlet connected to the low pressure accumulator 22, and a pump discharge connected to the fluid conduit between the master cylinder 14 and the control valve 20. The HCU 18 may also include other fluid flow devices such as an attenuator, restricted orifices, and check valves (none of which are illustrated), depending upon the system design. The exemplary control valve illustrated at 20 is preferably formed as a solenoid valve switchable between two positions. The control valve 24 is also preferably formed as a solenoid valve switchable between an open and a closed position. The valves 20 and 24, as well as the pump 26, are electrically connected to an electronic control module (not illustrated) and operated to provide desired system braking in a well-known manner.

Figure 2:
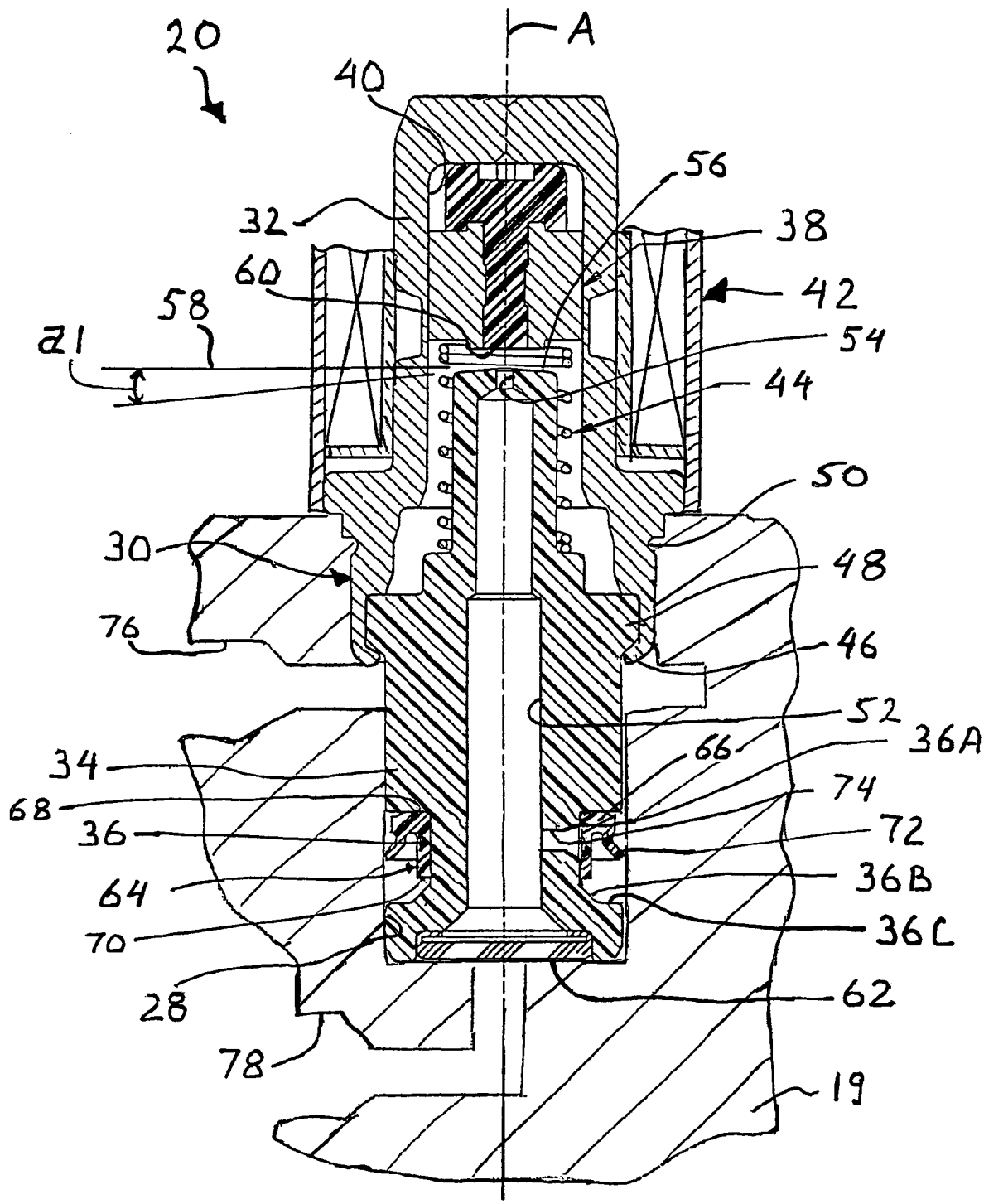
FIG. 2 is an enlarged cross sectional view of the normally open control valve illustrated in FIG. 1, showing the valve seat according to the invention.

A sectional view of a portion of the control valve 20 is illustrated in FIG. 2. The control valve 20 is received in a bore 28 formed in the housing 19. The control valve 20 preferably includes a valve body 30 having a first body portion or sleeve 32 and a second body portion or valve seat 34. The valve seat 34 includes a groove 36 formed circumferentially in an outer surface thereof.

The control valve 20, being a normally open control valve, further includes an armature 38 slidably received in a passageway or bore 40 of the sleeve 32, and biased away from the valve seat 34 when the control valve 20 is not energized. A coil assembly 42 is disposed about the sleeve 32. When the coil assembly 42 is energized to produce an electromagnetic field, the armature 38 is pulled toward the valve seat 34 to prevent fluid flow through the valve 20.

The armature 38 is disposed at an extreme of travel away from the valve seat 34 when the coil assembly 42 is deenergized such that the control valve 20 is in an open position, as shown in FIG. 2. A spring 44 preferably engages the armature 38 to urge the armature 38 away from the valve seat 34 when the control valve 20 is in the open position. When the coil assembly 42 is energized, the armature 38 is disposed at an extreme of travel toward the valve seat 34, such that the control valve 20 is in a closed position. When the control valve 20 is in the closed position, fluid flow through the control valve 20 is blocked. When the control valve 20 is in the open position, fluid flow through the control valve 20 is not blocked.

An annular portion 46 adjacent an open end of the sleeve 32 is crimped onto a radially outwardly extending flange 48 formed on the valve seat 34. Preferably, the sleeve 32 is retained within the bore 28 by clinching, wherein material of the housing 19 is forced into a groove 50 formed in the outer surface of the sleeve 32, as shown in FIG. 2. The combined sleeve 32 and valve seat 34 can also be retained in the bore 28 by any desired mechanical or chemical means operative to retain the sleeve 32 within the bore 28.

The valve seat 34 includes a longitudinal (preferably axial) fluid passageway 52 that terminates in a reduced diameter bore 54. A seat 56 is formed on an outer surface of the valve seat 34. If desired, the seat 56 can have an angle a1. Preferably, the seat 56 has an angle a1 within the range of from about three degrees to about five degrees, as measured from a plane 58 perpendicular to an axis A of the valve seat 34. More preferably, the seat 56 has an angle a1 of about four degrees. An end surface 60 of the armature 38 acts as a valve sealing element and engages the seat 56 when the armature 38 moves downwardly. When the end surface 60 engages the seat 56, the fluid passageway 52 is blocked.

A filter assembly 62 can be provided adjacent an inlet of the fluid passageway 52, although such a filter assembly is not required. A substantially resilient lip seal 64 can be provided in the groove 36 of the valve seat 34, for sealing between the valve seat 34 and the bore 28 of the housing 19. The lip seal 64 includes a resilient annular body 66 having a first end 68 and a second end 70. A resilient annular seal lip 72 flares outwardly from the body 66 in the general direction of the second end 70. It will be appreciated that any other desired type of fluid sealing means can also be used.

Figure 3:
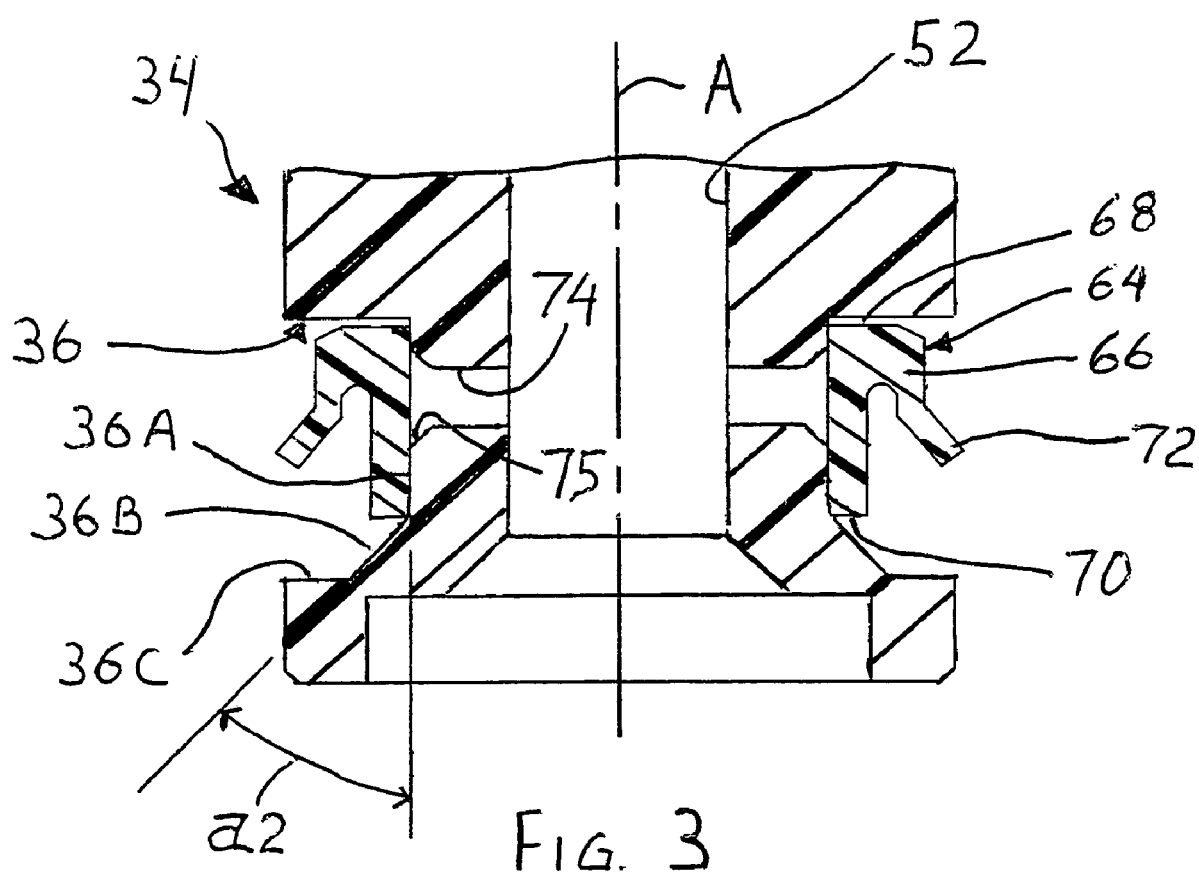
FIG. 3 is an enlarged cross sectional view of the valve seat illustrated in FIG. 2.

As best shown in FIGS. 2 and 3, at least one bore 74 is formed in the valve seat 34 and extends between the groove 36 and the passageway 52. Preferably, the bore 74 has a diameter of about 0.25 mm, however, the bore 74 can have any desired diameter. If desired, an opening 75 of the bore 74 at the groove 36 can be of a diameter larger relative to the diameter of the bore 74, thereby defining a tapered bore portion between the larger diameter opening and the bore 74. Although the bore 74 is illustrated as extending substantially radially between the groove 36 and the passageway 52, it will be understood that the bore 74 can be any bore which provides fluid communication between the groove 36 and the passageway 52. It will be appreciated that although two bores 74 are illustrated in FIG. 3, the valve seat 34 can include any desired number of bores 74, such as one bore or three bores which extend between the groove 36 and the passageway 28.

The groove 36 preferably includes a first groove surface 36A substantially parallel to the axis A of the valve seat 34. A second groove surface 36B is disposed adjacent the first groove surface 36A and extends downwardly and outwardly, as viewed in FIG. 3, from the first groove surface 36A. The second groove surface 36B is preferably disposed at an acute angle a2, such as an angle a2 within the range of from about 30 degrees to about 60 degrees relative to the first groove surface 36A. More preferably, the second groove surface 36B is disposed at an angle a2 within the range of from about 40 degrees to about 50 degrees relative to the first groove surface 36A. Most preferably, the second groove surface 36B is disposed at an angle a2 of about 45 degrees relative to the first groove surface 36A. A third groove surface 36C is disposed adjacent the second groove surface 36B and defines a step portion of the groove 36. The third groove surface 36C extends outwardly, as viewed in FIG. 3, from the first groove surface 36B. Preferably, the third groove surface 36C is disposed substantially perpendicular relative to the first groove surface 36A.

Preferably, fluid flow from the brake 16 through a first conduit 76, to the master cylinder 14 through a second conduit 78, is maintained between the lip seal 64 and the bore 28 of the housing 19 during all fluid pressure conditions during brake release. However, it is known that lip seals in known control valves can deform when a substantially high pressure differential exists between the brake 16 and the master cylinder 14, such as, for example, during brake release, thereby trapping pressure opposite the first end 68 of the lip seal 64. When the fluid pressure is substantially higher at the first end 68 of the lip seal 64 relative to the second end 70 of the lip seal 64, which would be the case when the differential pressure is increasing rapidly across the lip seal 64, for example, within the range of from about 5000 bar per second to about 38,000 bar per second, such a high pressure differential exists. Such a pressure differential can be caused, for example, when the vehicle driver's foot slips off the brake pedal during an ABS brake application. During such an event, the control valve 20 is in the closed position, forcing fluid to flow over the lip seal 64.

Figure 4:
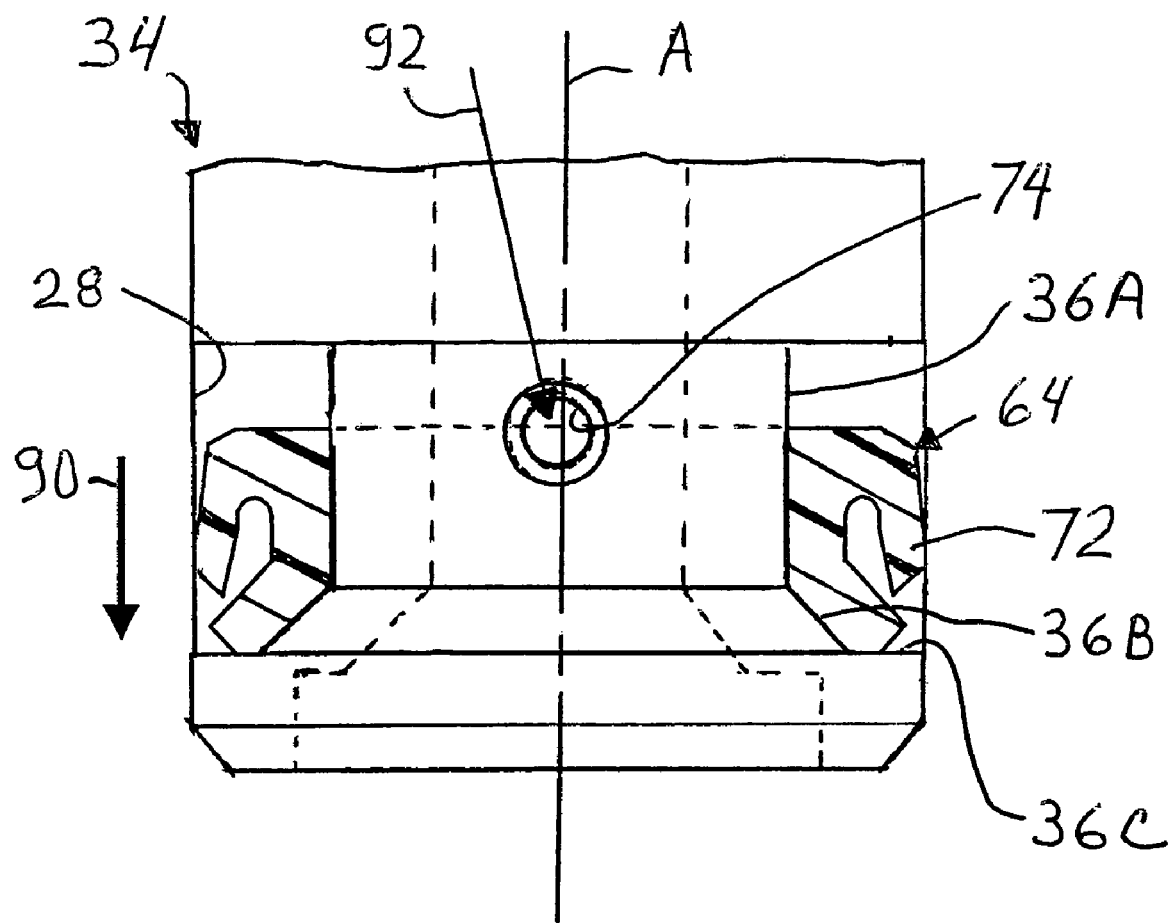
FIG. 4 is an enlarged view, partially in cross section, of the valve seat illustrated in FIGS. 2 and 3, showing the fluid flow path.

Such a pressure differential can cause the lip seal 64 to move downwardly, in the direction of an arrow 90 in FIG. 4, thereby exposing the bore 74. Further, such a pressure differential can force the flaring resilient annular seal lip 72 radially outwardly and against the bore 28 of the housing 19, thereby preventing fluid flow between the lip seal 64 and the bore 28. When fluid pressure behind (e.g. at the second end 70 of the lip seal 64 exceeds the fluid pressure at the first end 68, the resilient annular seal lip 72 yields, allowing fluid to flow between the lip seal 64 and the bore 28.

Advantageously, the second groove surface 36B and the radially extending bore 74 provides economical features that substantially eliminate such restriction of fluid flow when such a high pressure differential exists. When a high pressure differential exists, the lip seal 64 moves downward, as shown by the arrow 90 in FIG. 4, thereby exposing at least a portion of the bore 74. The radially extending bore 74 thereby provides a flow path for fluid, as shown by the arrow 92, even if the lip seal moves downward and outwardly, as best shown in FIG. 4, and seals the fluid flow path between the lip seal 64 and the bore 28. Specifically, fluid can continue to flow past an outer surface of the lip seal 64 and radially through the radially extending bore 74 to the bore 52. A fluid flow path is thereby defined between the brake 16 and the master cylinder 14, and fluid flow is maintained between the lip seal 64 and the bore 28 of the housing 19 during all fluid pressure conditions during brake release.

Additionally, it has been demonstrated that the second groove surface 36B causes the resilient lip seal 64 to deform downwardly and outwardly, as shown in FIG. 4, and into contact with the second groove surface 36B. Advantageously, the second groove surface 36B defines a ramp. When the high pressure differential between the brake 16 and the master cylinder 14 no longer exists, (e.g. when fluid pressure at the second end 70 of the lip seal 64 exceeds the fluid pressure at the first end 68) the ramp 36B provides a surface against which the resilient lip seal 64 can slide upwardly and inwardly as the lip seal 64 returns to a static (non-deformed) position as shown in FIG. 3. When the lipseal 64 returns to the static position as shown in FIG. 3, lipseal 64 again covers the bore 74, thereby preventing fluid flow through the bore 74 during normal braking operation. The step portion 36C limits the travel of the lipseal 64, further ensuring that the lipseal 64 can return to the static position and cover the bore 74.

Figure 5:
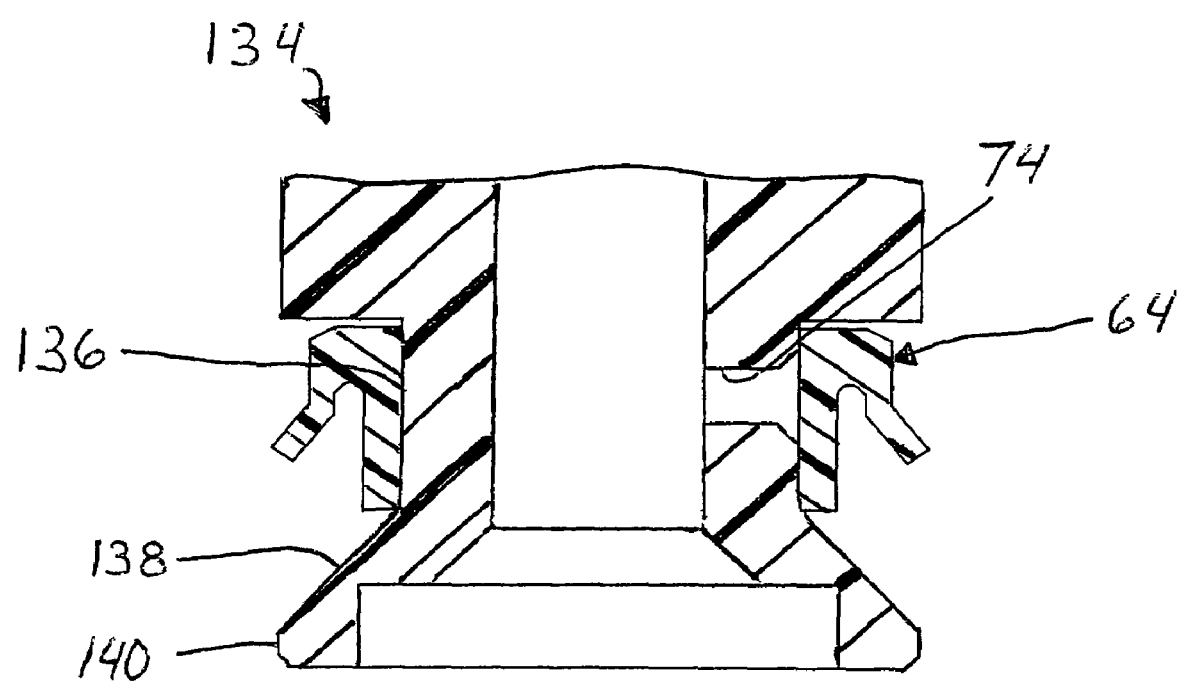
FIG. 5 is an enlarged cross sectional view of an alternate embodiment of the valve seat illustrated in FIG. 2.

An alternate embodiment of the valve seat is illustrated generally at 134 in FIG. 5. The valve seat 134 is similar to the valve seat 34, but includes a first groove surface 136 and a second groove surface 138. The second groove surface 138 extends from the first groove surface 136 to the outer surface 140 of the valve seat 134.

Figure 6:
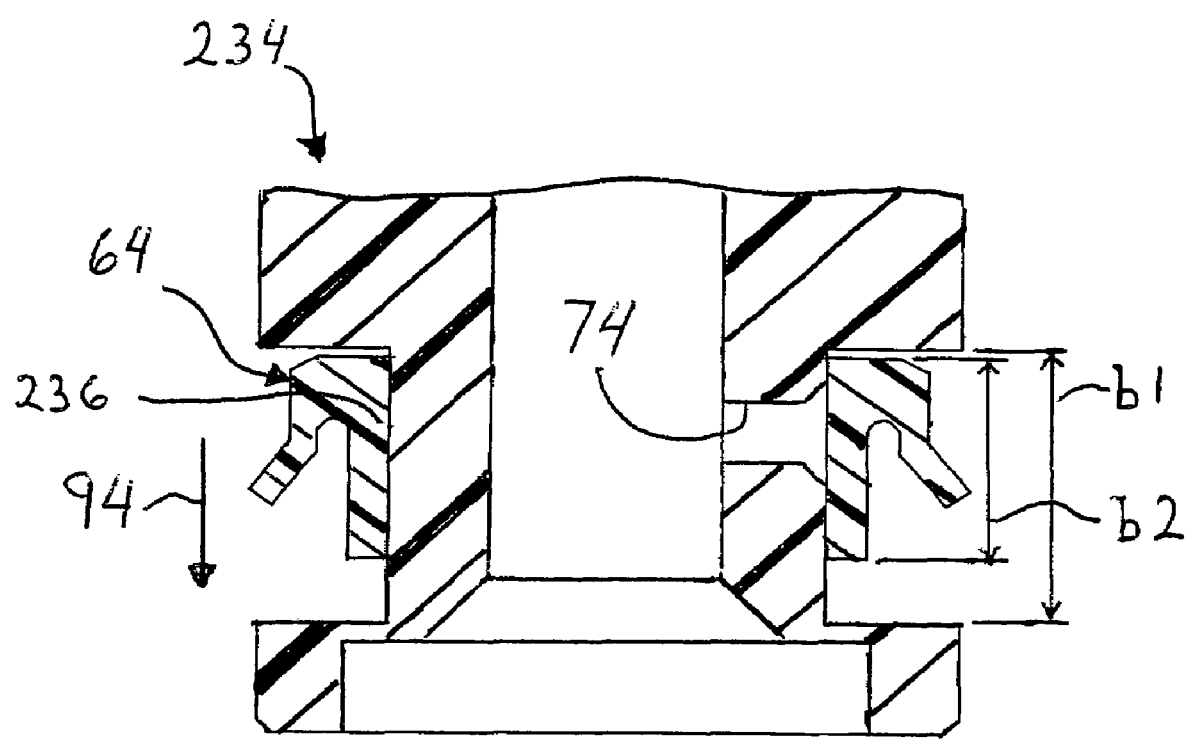
FIG. 6 is an enlarged cross sectional view of another alternate embodiment of the valve seat illustrated in FIG. 2.

Another alternate embodiment of the valve seat is illustrated generally at 234 in FIG. 6. The valve seat 234 is similar to the valve seat 34, but includes a first groove surface 236 having an axial length b1 greater than an axial length b2 of the lip seal 64, such that the lip seal 64 can move downwardly, in the direction of an arrow 94, when a high pressure differential exists.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control valve for controlling fluid flow in a hydraulic control unit, said control valve comprising:
a valve body defining an axis, said valve body comprising a first body portion and a second body portion adjacent said first body portion, a valve passageway being formed through said first and said second body portions, said second body portion including:
a groove formed circumferentially in an outer surface thereof, said groove defining a substantially axially extending first groove surface,
a bore extending between said first groove surface and said valve passageway to provide fluid communication between said first groove surface and said valve passageway; and
a substantially resilient seal slidably mounted against said first groove surface, said seal slidably movable between a first position substantially covering said bore and a second position exposing said bore to permit the flow of fluid within said groove to said valve passageway through said bore;
an armature slidably received in said valve bore of said first body portion; and
an electrical coil disposed about said valve body for selectively inducing a magnetic flux in said armature.

2. The valve seat assembly according to claim 1, wherein said first groove surface is substantially cylindrical.

3. The control valve according to claim 1, wherein a plurality of bores extends between said first groove surface and said valve passageway of said second body portion.

4. The control valve according to claim 1, wherein an axial length of said groove is greater than an axial length of said seal.

5. The control valve according to claim 1, wherein said seal is a lip seal.

6. The control valve according to claim 1, wherein said groove, said bore, and said seal define a flow path between a vehicle brake and a vehicle master cylinder.

7. The control valve according to claim 1, wherein said groove further defines a second groove surface adjacent said first groove surface, said second groove surface being disposed at an acute angle relative to said first groove surface.

8. The control valve according to claim 7, wherein said second groove surface extends from said first groove surface to said outer surface of said second body portion.

9. The control valve according to claim 7, wherein said second groove surface is disposed at an angle within the range of from about 40 degrees to about 50 degrees relative to said first groove surface.

10. The control valve according to claim 7, wherein said groove further defines a third groove surface adjacent said second groove surface, said third groove surface being disposed substantially perpendicular relative to said first groove surface.

11. A hydraulic control unit (HCU) for a vehicle brake system, said HCU comprising:
an HCU housing defining an HCU bore; and
a control valve mounted in said HCU housing, said control valve including:
a valve body defining an axis, said valve body comprising a first body portion and a second body portion adjacent said first body portion, a valve passageway being formed through said first and said second body portions, said second body portion including:
a groove formed circumferentially in an outer surface thereof, said groove defining a substantially axially extending first groove surface, a bore extending between said first groove surface and said valve passageway to provide fluid communication between said first groove surface and said valve passageway; and
a substantially resilient seal slidably mounted against said first groove surface, said seal slidably movable between a first position substantially covering said bore and a second position exposing said bore to permit the flow of fluid within said groove to said valve passageway through said HCU bore;
an armature slidably received in said valve passageway of said first body portion; and
an electrical coil disposed about said valve body for selectively inducing a magnetic flux in said armature.

12. The valve seat assembly according to claim 11, wherein said first groove surface is substantially cylindrical.

13. The hydraulic control unit according to claim 11, wherein a plurality of bores extends between said first groove surface and said valve passageway bore of said second body portion.

14. The hydraulic control unit according to claim 11, wherein an axial length of said groove is greater than an axial length of said seal.

15. The hydraulic control unit according to claim 11, wherein said seal is a lip seal.

16. The hydraulic control unit according to claim 11, wherein said groove, said bore, and said seal define a flow path between a vehicle brake and a vehicle master cylinder.

17. The hydraulic control unit according to claim 11, wherein said groove further defines a second groove surface adjacent said first groove surface, said second groove surface being disposed at an acute angle relative to said first groove surface.

18. The hydraulic control unit according to claim 17, wherein said second groove surface extends from said first groove surface to said outer surface of said valve seat body.

19. The hydraulic control unit according to claim 17, wherein said second groove surface is disposed at an angle within the range of from about 40 degrees to about 50 degrees relative to said first groove surface.

20. The hydraulic control unit according to claim 17, wherein said groove further defines a third groove surface adjacent said second groove surface, said third groove surface being disposed substantially perpendicular relative to said first groove surface.

21. A control valve for controlling fluid flow in a hydraulic control unit, said control valve comprising:

a valve body, said valve body comprising a first body portion and a second body portion adjacent said first body portion, a valve passageway being formed through said first and said second body portions, said second body portion including:

a groove formed circumferentially in an outer surface thereof, said groove defining a first groove surface substantially parallel to an axis of said valve body, a bore extending between said groove surface and said valve passageway to provide fluid communication between said groove surface and said valve passageway; and a substantially resilient seal disposed in said groove of said second body portion;

an armature slidably received in said valve bore of said first body portion; and an electrical coil disposed about said valve body for selectively inducing a magnetic flux in said armature, wherein said groove further defines a second groove surface adjacent said first groove surface, said second groove surface being disposed at an acute angle relative to said first groove surface.

* * * * *